United States Patent
Holmes

(10) Patent No.: US 10,942,866 B1
(45) Date of Patent: Mar. 9, 2021

(54) PRIORITY-BASED CACHE

(71) Applicant: EMC IP Holding Company LLC, Hopkinton, MA (US)

(72) Inventor: Dennis Holmes, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/221,469

(22) Filed: Mar. 21, 2014

(51) Int. Cl.
*G06F 12/121* (2016.01)
*G06F 12/123* (2016.01)

(52) U.S. Cl.
CPC .......... *G06F 12/121* (2013.01); *G06F 12/123* (2013.01)

(58) Field of Classification Search
CPC .......... G06F 17/3048; G06F 17/30306; G06F 17/30902; G06F 12/126; G06F 12/12; G06F 12/123; G06F 12/0871; G06F 12/084; G06F 2212/614; G06F 12/121; G06F 2212/60; G06F 12/0897
See application file for complete search history.

(56) References Cited

U.S. PATENT DOCUMENTS

| | | | | |
|---|---|---|---|---|
| 6,449,695 B1* | 9/2002 | Bereznyi | ............. | G06F 16/9574 711/134 |
| 6,735,670 B1* | 5/2004 | Bronstein | ............. | H04L 45/745 365/49.1 |
| 2004/0034740 A1* | 2/2004 | Britton | .................. | G06F 12/126 711/129 |
| 2006/0143396 A1* | 6/2006 | Cabot | ................... | G06F 12/121 711/134 |
| 2008/0189305 A1* | 8/2008 | Bildhaeuser | ........ | G06F 17/3048 |
| 2013/0007371 A1* | 1/2013 | Hilerio | ................ | G06F 12/0866 711/133 |
| 2013/0024421 A1* | 1/2013 | Shinohara | ............. | G06F 3/0608 707/622 |

* cited by examiner

*Primary Examiner* — Jane Wei
(74) *Attorney, Agent, or Firm* — Dergosits & Noah LLP; Todd A. Noah

(57) ABSTRACT

Disclosed are systems and methods for using a priority cache to store frequently used data items by an application. The priority cache may include multiple cache regions. Each of the cache regions may be associated with a different priority level. When a data item is to be stored in the priority cache, the application may review the context of the data item to determine if the data item may be used again in the near future. Based on that determination, the application may be configured to assign a priority level to the data item. The data item may then be stored in the appropriate cache region according to its assigned priority level.

20 Claims, 13 Drawing Sheets

PRIORITY-BASED CACHE

BACKGROUND

The present invention relates to the field of information technology, including, more particularly, to systems and techniques for cache memory management.

Large organizations, such as businesses, often use one or more computer programs, such as enterprise applications, during the course of their activities. An enterprise application may be enterprise software that is used to offer services from a cloud-based environment. The enterprise application may perform various operations that may cause accessing, updating or adding new data items. The data items may be stored in a database. The database may be associated with a database cache. When a database query operation results in a large number of data items, the data items in the database cache may be replaced by new data items. This may not be desirable if some of the replaced data items are frequently used by the application.

DETAILED DESCRIPTION

For some embodiments, an application is configured to assign priority levels to data items that are to be stored in a priority cache. The priority cache may be associated with a database cache. The priority cache is logically divided into different cache regions. Each of the cache regions is associated with a unique priority level. When a data item is to be stored in the priority cache, the priority level of the data item is used to determine the appropriate cache region to store the data item. A data item is stored in a cache region using a linked list. The linked list may be implemented as a least recently used (LRU) linked list (referred to as LRU linked list) where the most recently used (MRU) item is added to the tail of the linked list, and the LRU data item is positioned at the head of the linked list. The priority level of a data item may be updated by the application. If the updated priority level is higher than a current priority level, the data item may be promoted from its current LRU linked list to a LRU linked list associated with a cache region having a higher priority level. A data item may be removed from the head of its LRU linked list to make room for another data item if the LRU linked list is full.

Figure 1:
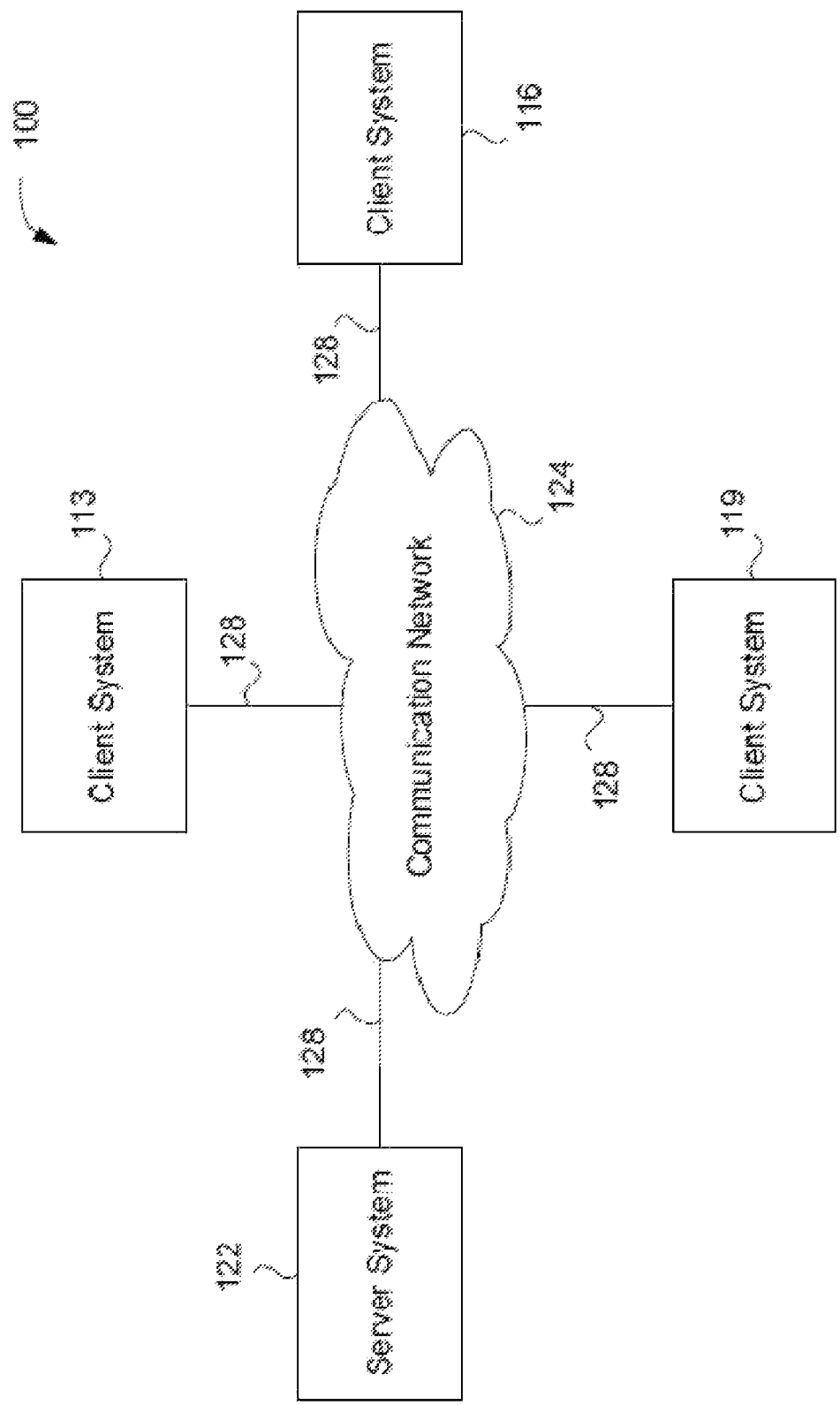
FIG. 1 shows a block diagram of a client-server system and network, implemented in accordance with an exemplary embodiment.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
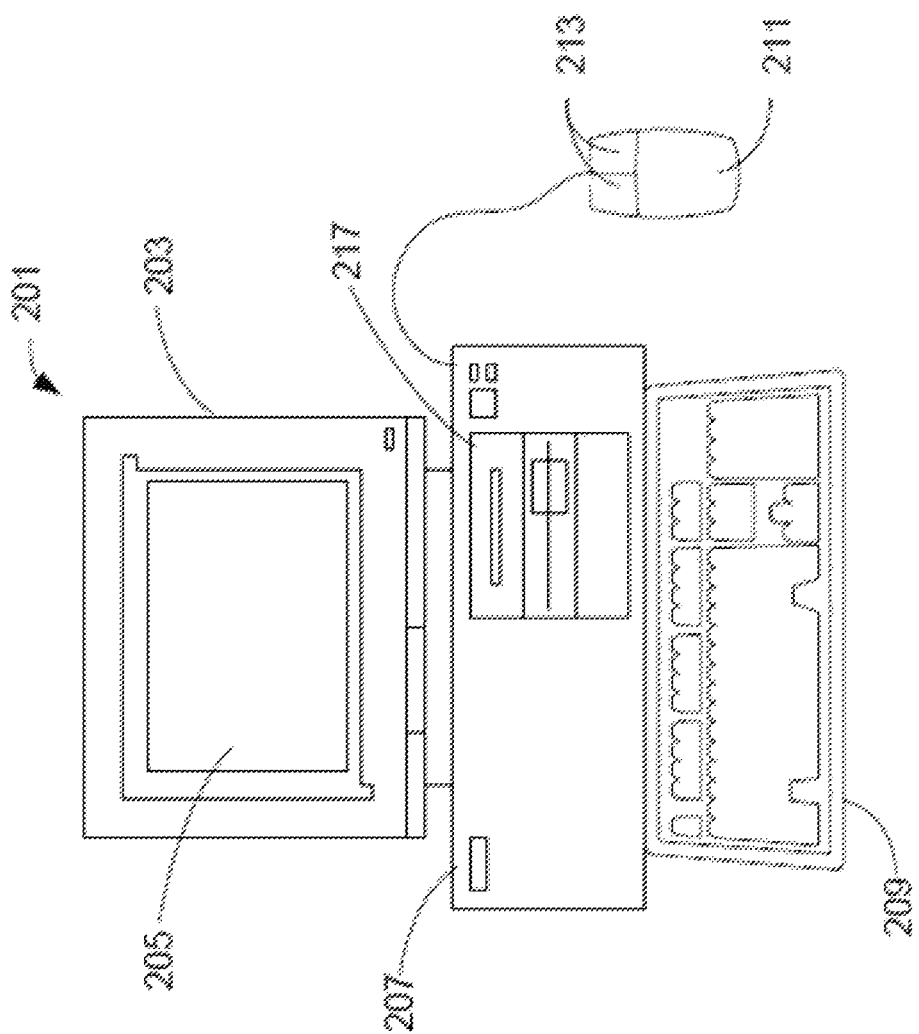
FIG. 2 shows a more detailed diagram of an exemplary client or computer, implemented in accordance with an exemplary embodiment.

FIG. 2 shows an exemplary client or server system. In an embodiment, a user interfaces with the system through a computer workstation system, such as shown in FIG. 2. While FIG. 2 illustrates a computer workstation, the user can interface with the system through a mobile device such as a mobile phone, laptop computer or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
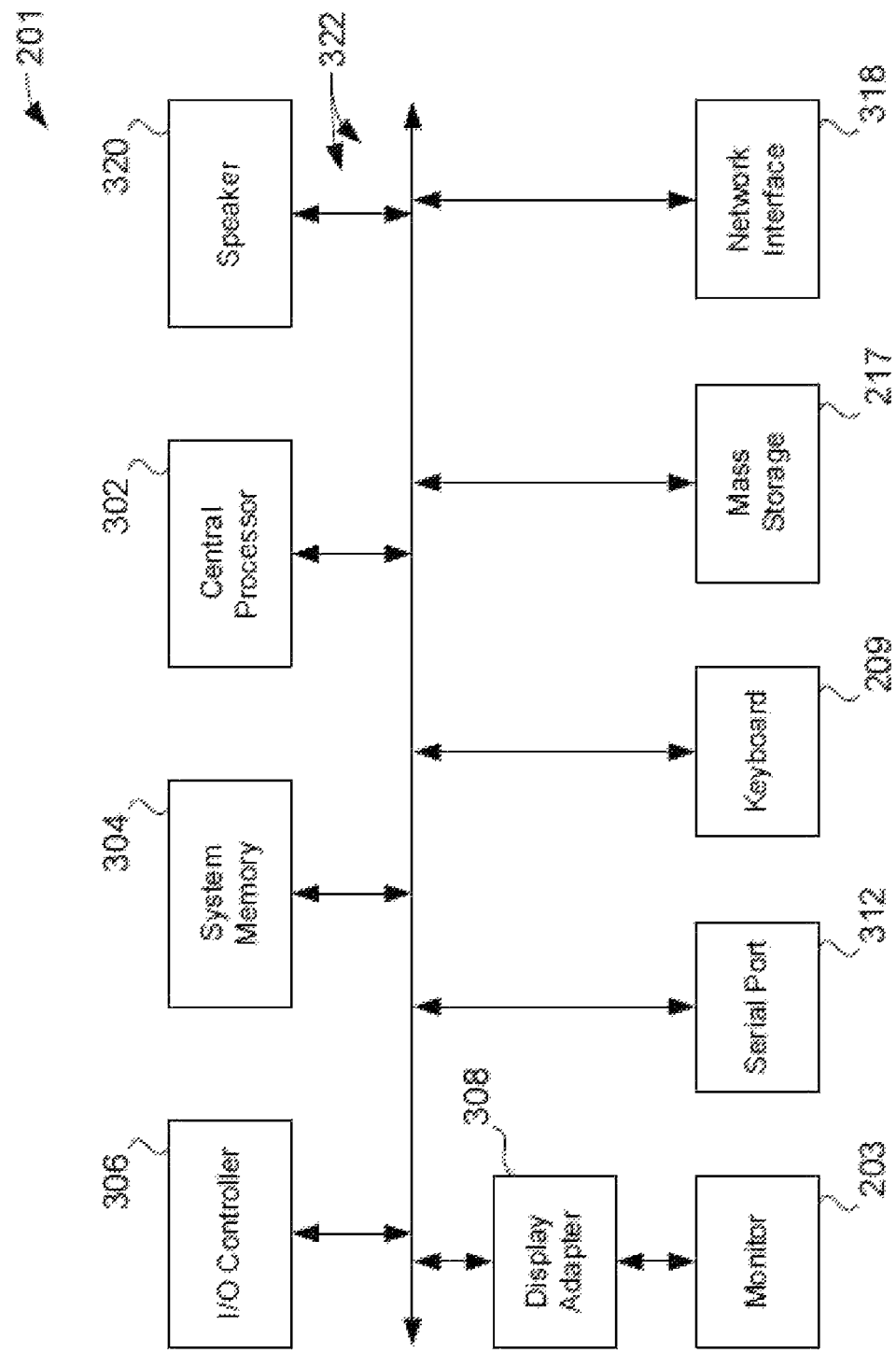
FIG. 3 shows a system block diagram of a client computer system, implemented in accordance with an exemplary embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C #, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
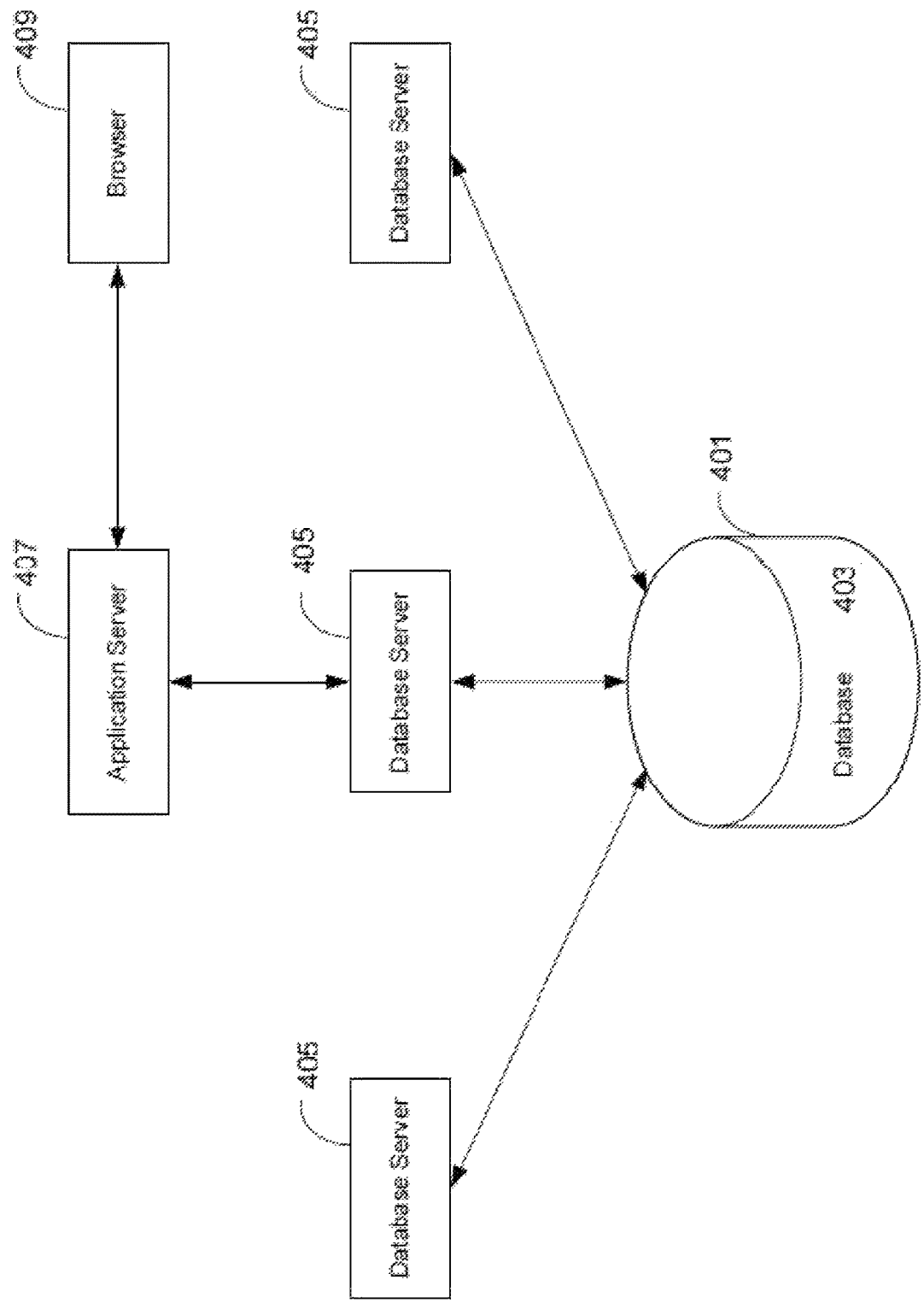
FIG. 4 shows a data source or data service in the form of a database system, implemented in accordance with an exemplary embodiment.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 5:
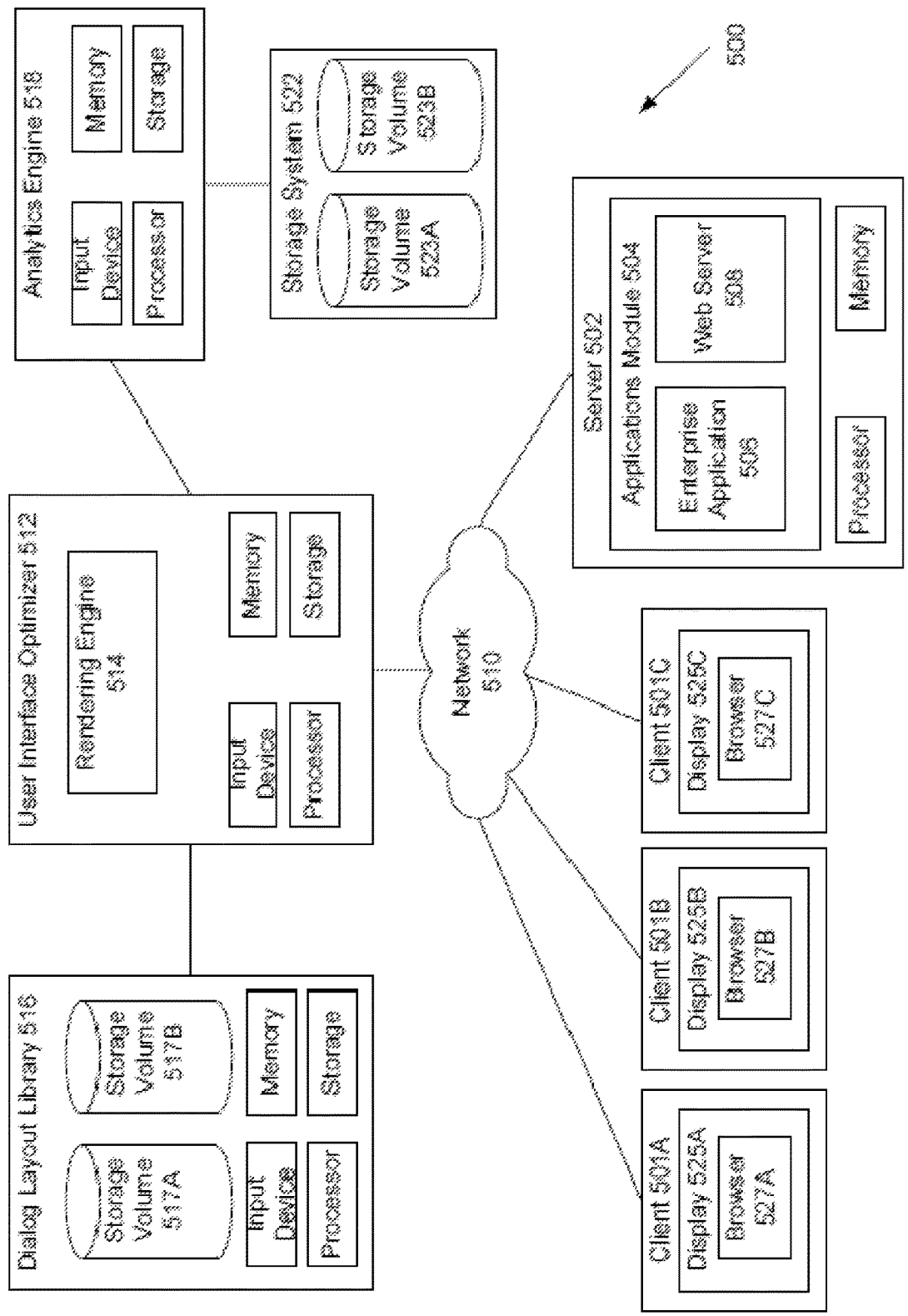
FIG. 5 shows a block diagram of an example of a system 500 for selecting a dialog layout, implemented in accordance with an exemplary embodiment.

FIG. 5 shows a block diagram of an example of a system 500 for selecting a dialog layout, implemented in accordance with some implementations. In various implementations, system 500 may handle a request to optimize a dialog layout of a software application, such as an enterprise application. In some implementations, system 500 may include server 502, applications module 504, enterprise application 506, web server 508, network 510, user interface optimizer 512, rendering engine 514, dialog library 516, storage volume 517A, storage volume 517B, analytics engine 518, storage device 522, storage volume 523A, and storage volume 523B. Moreover, system 500 may include any number of clients such as first, second, and third clients 501A, 501B, and 501C which access server 502 via network 510.

The clients are general purpose computers with hardware and software, such as shown in FIGS. 1 and 3 described above. For example, the first client includes a first display 525A, a first application program (e.g., first browser program) 527A, an input device, a processor, memory, and storage. Similarly, the second client includes a second display 525B, a second application program (e.g., second browser program) 527B, an input device, a processor, memory, and storage. The third client includes a third display 525C, a third application program (e.g., third browser program) 527C, an input device, a processor, memory, and storage.

FIG. 5 shows three clients. It should be appreciated that an enterprise can have any number of clients such as tens, hundreds, or thousands of clients. The clients execute executable code (or computer-readable code) that embodies a technique or algorithm as described in this application. The browser is an application program that can request, receive, and process data from a user, the server, or both. The data can be shown via a display. While FIG. 5 illustrates the data being displayed on a client machine, the data can also be displayed on a mobile device such as a mobile phone, laptop computer or computer tablet.

In various implementations, system 500 may include server 502. The server includes components similar to the components described in FIGS. 1 and 4. In some implementations, server 502 may include hardware and software used to run one or more services to serve the needs of other computers and users on network 510. Thus, server 502 may include one or more processors and memory capable of executing software operations and serving webpages. It will be appreciated that in some implementations, server 502 may comprise several servers in a distributed or cloud computing network.

In various implementations, server 502 may include an applications module, such as applications module 504. In some implementations, applications module 504 includes software and hardware that may be used to execute one or more software applications. Thus, applications module may include software and/or firmware instructions that configure the functionality of server 502.

According to various implementations, applications module 504 includes enterprise application 506. In particular implementations, enterprise application 506 may include software instructions that, when executed by one or more processors, execute one or more processes associated with an enterprise application. Thus, enterprise application 506 may include software instructions that configure one or more tasks performed by a user when the user is performing a process of the enterprise application.

In various implementations, applications module 504 may include an application used to serve webpages, such as web server 508. In some implementations, web server 508 serves web pages to a client machine operated by a user of the enterprise application. Thus, according to various implementations, an application such as a web server 508 may deliver webpages and other content from a storage volume of server 502 to the browsers of the client machines. Thus, according to various implementations, an enterprise application may be accessible to a client machine over the network using the browser. For example, first, second, and third users at clients 501A-501C, respectively, login by using a browser to access the application. The application may require that the user input a username and a password so that the user can be authenticated. The users may be employees, colleagues, partners, or members of the same company, organization, entity, partnership, joint venture, or have a business relationship (e.g., supplier-manufacturer relationship, or client-vendor relationship), and so forth.

In various implementations, system 500 may include user interface (UI) optimizer 512. In some implementations, UI optimizer 512 may be configured to handle requests to optimize a dialog layout for one or more dialogs in a process of an enterprise application. Thus, UI optimizer 512 may communicate with other entities, such as a client machine or server 502, via network 510 and receive a request to optimize a dialog layout. UI optimizer 512 may handle the request by communicating with other components of system 500 that may be coupled to a network, such as analytics engine 518 and dialog layout library 516. UI optimizer may return a result or response to the request via network 510.

In various implementations, UI optimizer 512 may include a rendering engine, such as rendering engine 514. In various implementations, rendering engine 514 may be configured to render a data object into a rendered data object capable of being displayed in a display device of a client machine. For example, rendering engine 514 may render an intermediate data structure into hypertext markup language (HTML) capable of being displayed by an web browser. Thus, according to various implementations, rendering engine 514 may be configured to render a dialog layout into a dialog that may be displayed in a web browser of a client machine, mobile phone, laptop computer or computer tablet.

In various implementations, system 500 may include dialog layout library 516. In some implementations, dialog layout library 516 may include one or more storage volumes, such as storage volume 517A and 517B. In particular implementations, dialog layout library 516 may be configured to store information associated with various dialog layouts, such as content that may be displayed in the dialog layouts. For example, dialog layout library 516 may store one or more data values identifying the content of a text box or the appearance and function of a control. Thus, dialog layout library 516 may provide a repository for information and content associated with various different dialog layouts that may be used at various different stages of the methods described herein.

In various implementations, system 500 may include analytics engine 518. In some implementations, analytics engine 518 may be configured to dynamically analyze responses from users of the enterprise application and select one or more dialog layouts to be provided to the users. Thus, analytics engine 518 may be configured to track input received from users and other components of system 500, and may be further configured to make one or more decisions based on that tracked information.

In various implementations, analytics engine 518 may be configured to store data and metadata related to decisions that have been made, and data that was used to make them. Thus, according to some implementations, system 500 may include storage system 522, where storage system 522 may be coupled to analytics engine 518. In various implementations, storage system 522 may include one or more storage volumes, such as storage volume 523A and storage volume 523B. In particular implementations, storage system 522 may store information generated by analytics engine 518 and used by analytics engine 518. Thus, one or more data values identifying decisions made by and metrics measured by analytics engine 518 may be stored in storage system 522.

Figure 6A:
FIG. 6A shows an example of cache implementations in a system, performed in accordance with an exemplary embodiment.
Figure 6A:
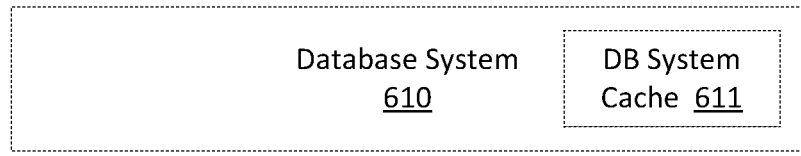
Figure 6A:
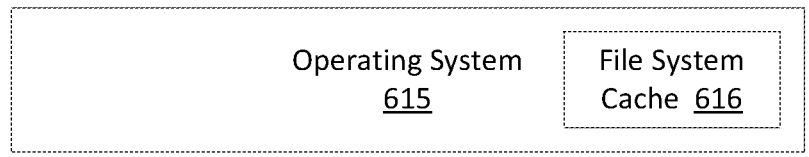

FIG. 6A shows an example of cache implementations in a system, performed in accordance with some implementations. The priority cache 606 may be associated with application 605 which may be part of the application server 407 (shown in FIG. 4). The application may interact with database system 610. The database system 610 may include one or more database servers and one or more databases (shown in FIG. 4). The one or more databases may be stored in a storage device which is part of a file system. The database system 610 may be associated with an operating system 615 which may include logic to interact with the file system. To improve performance, the operating system 615 may use a file system cache 616. Similarly, the database system 610 may use the database system cache 611 (also referred to as a database cache). Many general-purpose cache designs use a replacement policy that removes existing data items from the cache and replace them with new data items. One such replacement policy is the least recently used (LRU). The LRU policy may add a new data item to the cache or promote an existing data item within the cache any time that data item is accessed. The LRU policy may not consider the context of the data items in the database system cache 611, and it is susceptible to data scan operations. With data scan operations, one-time iteration over a large number of data items may cause overrun or replacement of many or all data items in the database system cache 611 if the amount of data items is more than the capacity of the database system cache 611. This normally would be sufficient for most generalized applications. However, in certain situations, many of the replaced data items may include data items that may be accessed frequently.

For some embodiments, the application 605 may include operations that frequently access the same data items. For example, the application 605 may include media database operations that repeatedly access the same data items in a media database. The media database may include data items for volumes, save sets, and client ID maps. For some embodiments, the application 605 may be associated with a priority cache 606. For the media database, a separate cache instance of the priority cache 606 may be used for each data item type (e.g., volumes, save sets, client ID) allowing for separate sizing and priority management.

Figure 6B:
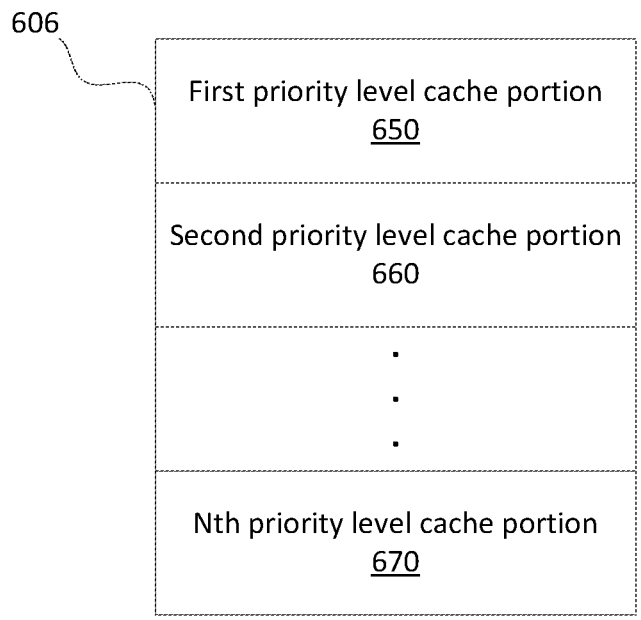
FIG. 6B shows an example of a priority cache, performed in accordance with an exemplary embodiment.

FIG. 6B shows an example of a priority cache, performed in accordance with an exemplary embodiment. The priority cache 606 may be configured to store copies of the data items that may be repeatedly accessed by the application 605. The priority cache 606 may be logically divided into cache regions. Each of the cache regions may be associated with a priority level and may be configured to store data items assigned with the same priority level. For example, the priority cache 606 may include cache region 650 associated with a first priority level, cache region 660 associated with a second priority level, and cache region 670 associated with an $n^{th}$ priority level. For example, the first priority level may be considered the highest priority level, and the data items stored in the cache region 650 may need to be replaced less frequently than the data items in the other cache regions. Each cache region may store zero or more data items. Each cache region may have a minimum size (also referred to as a reservation). The reservation for each cache region may enable storing a minimum number of data items for each priority level. The reservation prevents higher priority data items from consuming the entire cache at the expense of lower priority data items. The capacity of each cache region may vary depending on the type of data items it is configured to store. For example, the size of the cache region 650 may be larger than the size of the cache region 660 because it is configured to store a higher amount of data items configured with a higher priority level.

For some embodiments, the sum of all the reservations for all the cache regions may not need to be equal to the total capacity of the priority cache 606. A shared pool of cache capacity may be used to allocate additional space to one or more cache regions when necessary. For some embodiments, the unused portion of the reservation of a cache region may be borrowed or reallocated to one or more of the other cache regions. For example if a cache region has a reservation of ten (10) data entries but its associated LRU linked list contains only seven (7) data entries, then the remaining unused space (for three (3) data entries) may be available for use with the other cache regions. For some embodiments, when a cache region associated with a higher priority level has exceeded its reservation, additional cache space may be claimed from a cache region associated with a lower priority level. If the cache region associated with the lower priority level has exceeded its own reservation, a data item from the cache region associated with the lower priority level may be dropped for the cache space to be claimed.

Figure 7:
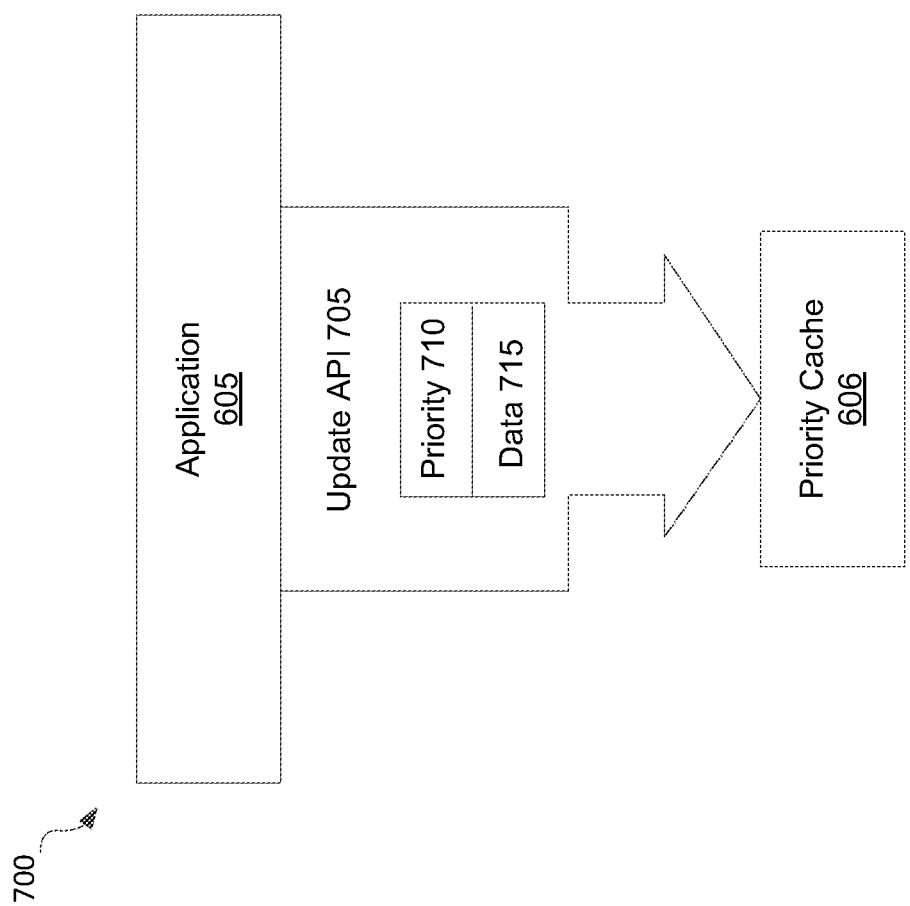
FIG. 7 shows an example of an update to a priority cache, performed in accordance with an exemplary embodiment.

FIG. 7 shows an example of an update to a priority cache, performed in accordance with an exemplary embodiment. The application 605 may use an application programming interface (API) 705 to update the priority cache 606 with the data item 715. For some embodiments, the application 605 is configured with logic to give it the ability to evaluate the data item 715 based on its context and determine if the data item 715 will be used in the short term. An appropriate priority level 710 is then assigned by the application 605. For example, a high priority is assigned if the data item 715 is going to be used very shortly, and a low priority is assigned if the data item 715 is less likely to be used in the short time. For some embodiments, the application 605 may be configured to decide not to add a low value data item to the priority cache 606 when further reference to the data item may not be likely. The use of different priority levels may prevent lower priority data items from displacing higher priority data items from the priority cache 606. For example, when a low priority level cache region is full, and a new low priority level data item is to be added to that cache region, a LRU data item from the low priority level cache region is removed to enable adding the new data item, instead of adding the new data item to a higher priority level cache region.

Figure 8:
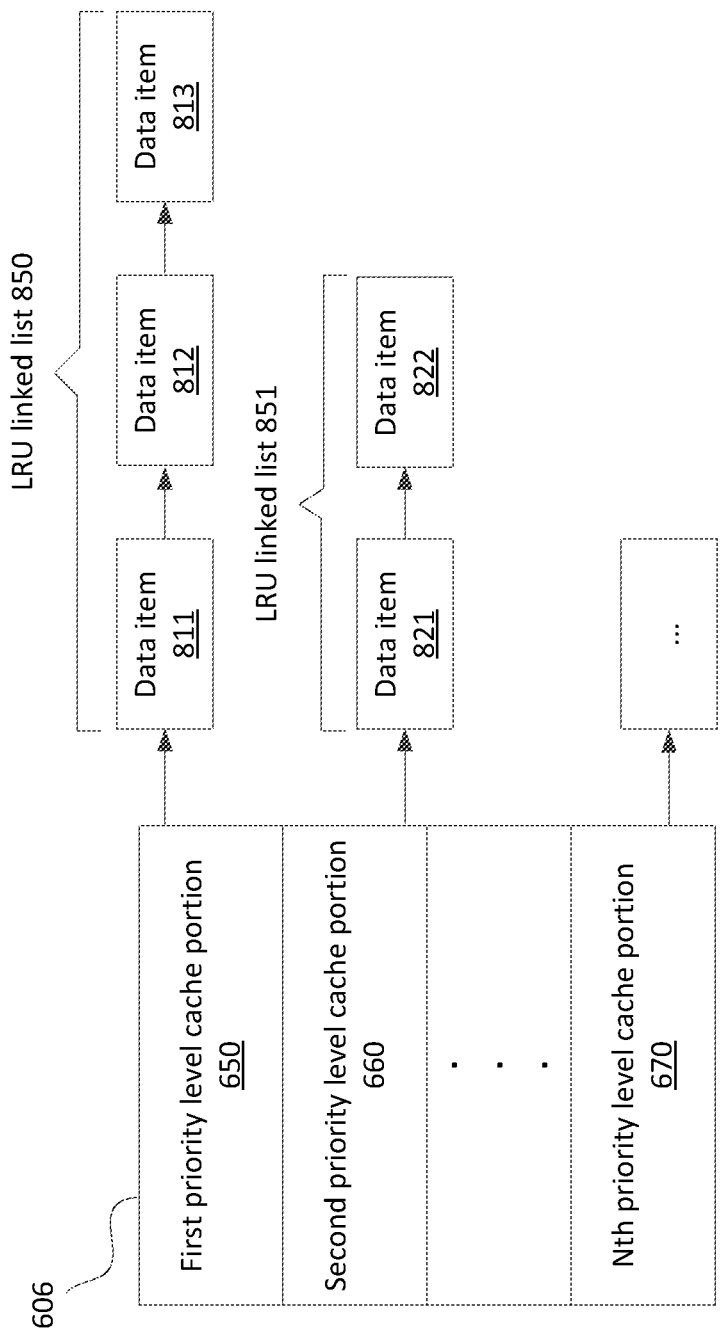
FIG. 8 shows an example of a priority cache with data items in the different cache regions, performed in accordance with an exemplary embodiment.

FIG. 8 shows an example of a priority cache with data items in the different cache regions, performed in accordance with an exemplary embodiment. In this example, the cache region 650 includes three data items 811, 812 and 813. The cache region 660 includes two data items 821 and 822.

The number of distinct cache regions and associated priority levels may vary depending on the implementation and depending on whether the application 605 is configured with sufficient logic or intelligence to make more granular determinations. For example, there may be two cache regions, one associated with a high priority level and one associated with a low priority level, where the high priority level may be considered more important than the low priority level.

The cache 606 may be configured to maintain an array of LRU linked lists separated by priority level. The priority values may be used as the basis for the array index. An LRU linked list (e.g., LRU linked list 850) may be used to manage all data items (e.g., data items 811, 812, 813) at a given priority level (e.g., first priority level). Each LRU linked list may be implemented using a linked list data structure to link a distinct set of data items in the cache 606. Each LRU linked list is ordered by when a data item is last used. A head of the LRU linked list may be used to identify the least recently used data item, and the tail of the LRU linked list may be used to identify the most recently used (MRU) data item. In the current example, the data item 811 may be the head and the data item 813 may be the tail of the LRU linked list 850. Similarly, the data item 821 may be the head and the data item 822 may be the tail of the LRU linked list 851. For some embodiments, the cache replacement model is least recently used (LRU) by priority. That is, a data item at the head of the LRU linked list is removed based on it being the LRU data item. This allows LRU methodology but prevents frequent access of low-priority items from displacing high-priority items.

Figure 9:
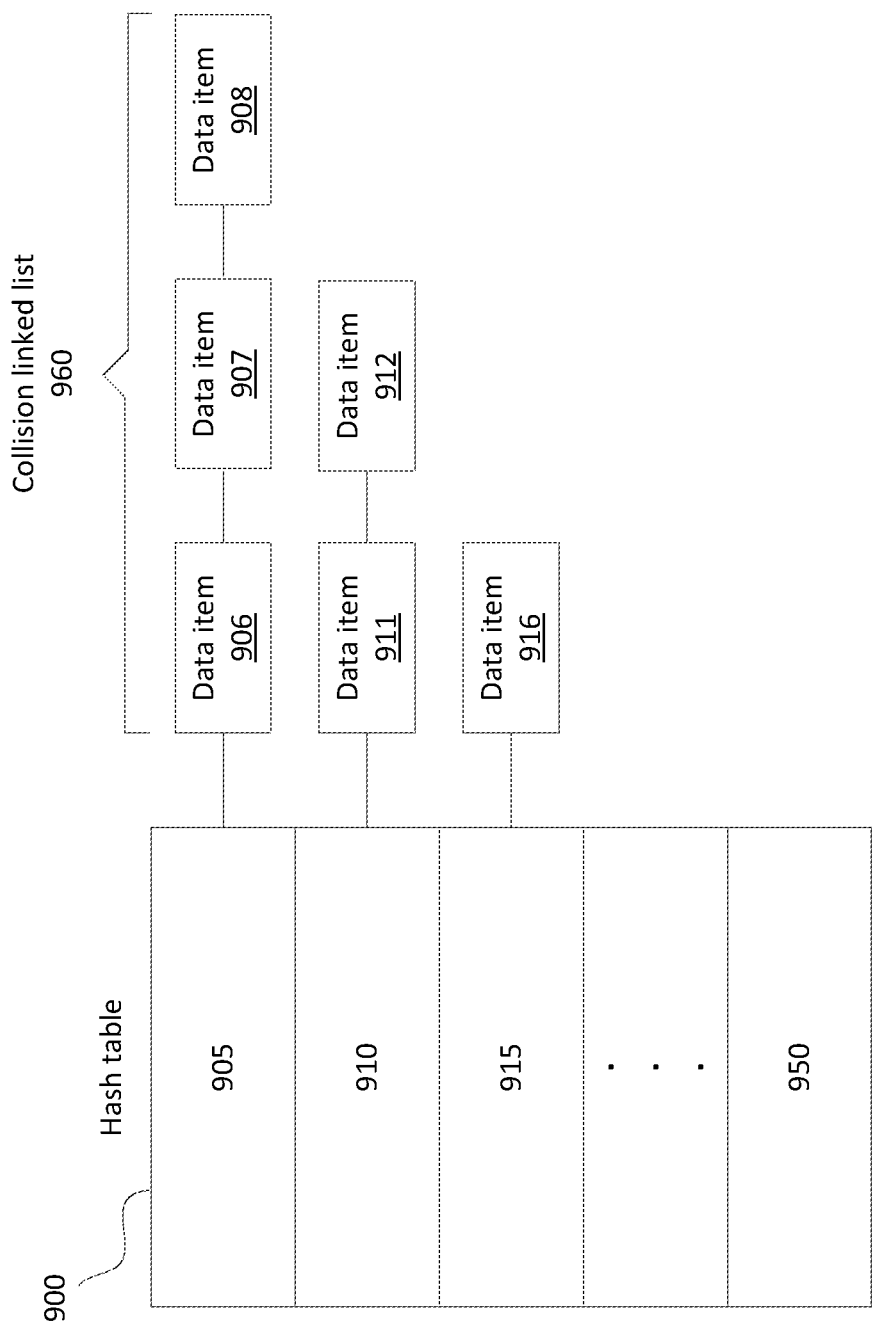
FIG. 9 shows an example of a hash table that may be used to look up data items in the priority cache, performed in accordance with an exemplary embodiment.

FIG. 9 shows an example of a hash table that may be used to look up data items in the priority cache, performed in accordance with an exemplary embodiment. For some embodiments, the caching strategy using the priority cache 606 is to optimize simple, critical workflows but not duplicate database query functionality. Thus an approach is used where the priority cache 606 can satisfy a query which is based on a unique identifier of the data item. For example, when using the priority cache 606 with the media database, the unique identifier for the volumes and save sets is the volume ID or the save set ID. For client lookups, the client ID may be used; however, the client name may be used instead of the client ID since it is also unique and a more frequently used query criterion.

For some embodiments, the organization of the priority cache 606 may be based on a single-key hash table 900. This may be used to map a data item to a slot in a hash table 900 for lookup purposes. For example, the hash table 900 may help determining where to store a data item, and how to look up or access a data item. Each of the slots or buckets (e.g., 905, 910, 915, 950, etc.) of the hash table 900 may be associated with a key generated by a hash function using a unique identifier associated with the data item (e.g., the unique identifier for a volume is the volume ID, as described above). For example, the data item 906 is associated with the bucket 905 of the hash table 900. It may be possible that the hash function may generate the same key for a different data item thus causing more than one data item to be associated with a bucket (referred to as a collision). Collisions are handled by using a linked list in each hash bucket. In the current example, the bucket 905 is associated with a collision linked list 960 that shows three data items 906, 907 and 908. Similarly, the data items 911 and 912 are associated with the bucket 910. There may be no collision with the bucket 915 since there is only one data item 916.

Figure 10:
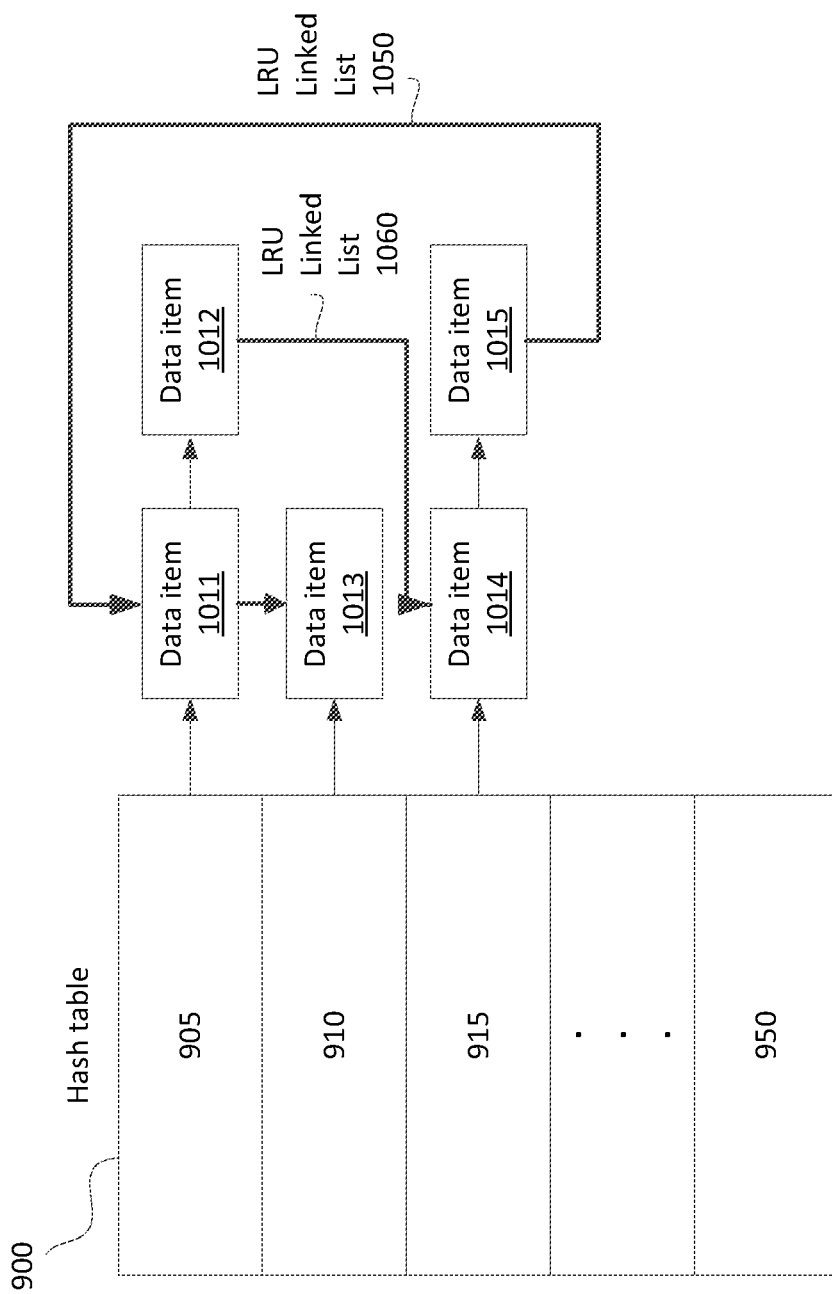
FIG. 10 shows an example LRU linked lists superimposed onto the hash table structure, performed in accordance with an exemplary embodiment.

FIG. 10 shows an example LRU linked lists superimposed onto the hash table structure, performed in accordance with an exemplary embodiment. In the current example, there are two LRU linked lists 1050 and 1060. The LRU linked list 1050 includes the data items 1015, 1011 and 1013. Each of the data items 1015, 1011 and 1013 is associated with a respective key 915, 905 or 910 of the hash table 900. The data items 1015, 1011 and 1013 may be associated with the same priority level. The data item 1015 may be at the head of the LRU linked list 1050, and the data item 1013 may be at the tail of the LRU linked list 1050. Similarly, the LRU linked list 1060 includes the data items 1012 and 1014 with the data item 1012 at the head and the data item 1014 at the tail. The data items 1012 and 1014 may be associated with the same priority level. It may be noted that the data items 1014 and 1015 may be associated with the same key 915 of the hash table 900 because of collision, even though each may be associated with a different priority level. The data items 1011 and 1012 may also be in the same situation.

For some embodiments, the data items described with the priority cache 606 (shown in FIG. 8) and with the hash table 900 (shown in FIG. 9) are not duplicated data items of one another for priority and order management. The priority cache 606 stores one copy of a data item for both purposes of lookup and priority management. For some embodiments, the hash table 900 may be implemented as a cache of the data items, and the priority management method described with FIG. 8 may be superimposed upon the look up method (shown in FIG. 9) by adding another set of links describing the priority division and ordering. For some embodiments, the priority cache 606 may be independent of other caches (e.g., database system cache 611 or the file system cache 616 shown in FIG. 6) and the structure and content of those caches may not directly relate to the priority cache 606.

Figure 11:
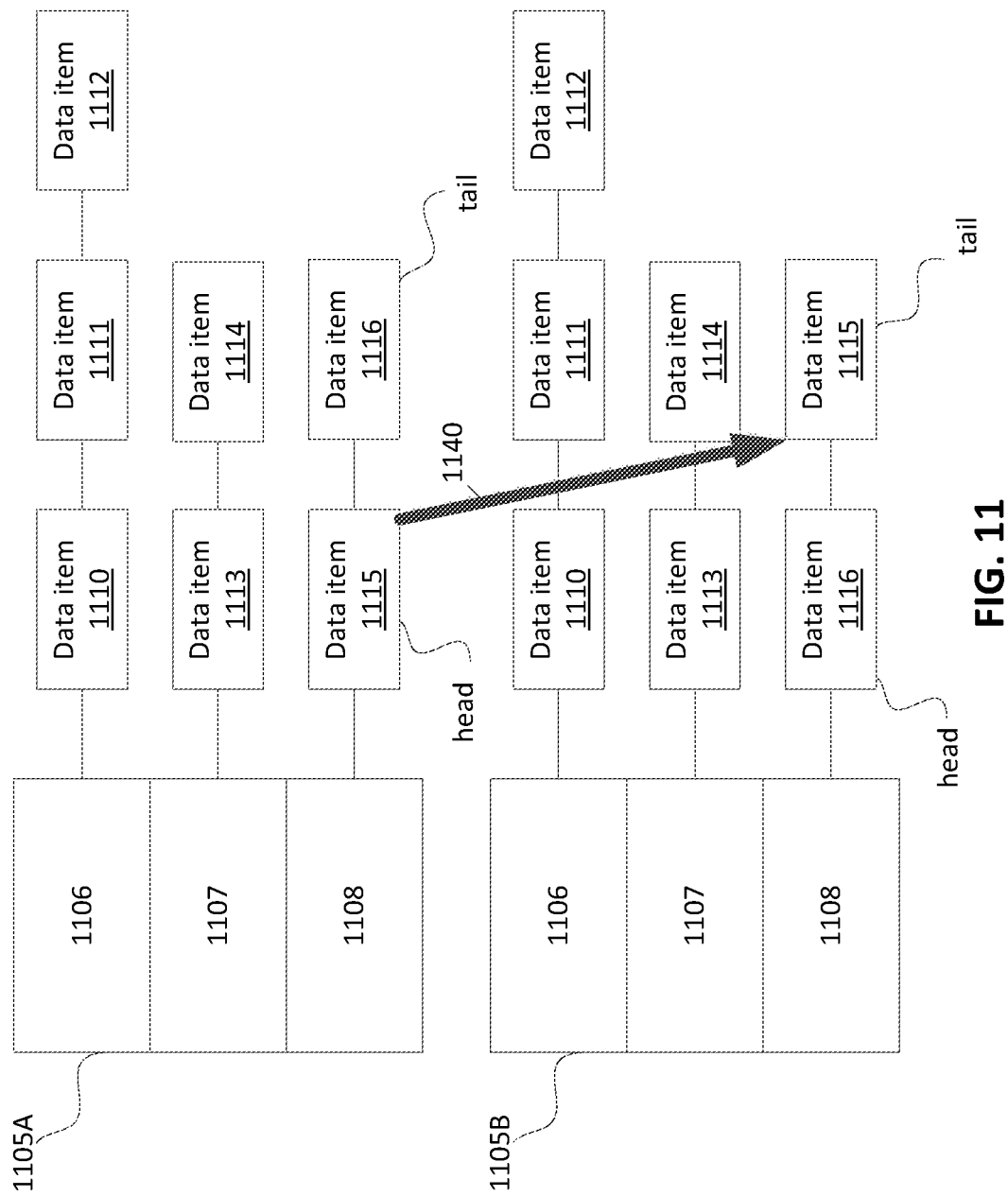
FIG. 11 shows an example of two instances of the same priority cache to reflect changes due to a cache access or update, performed in accordance with an exemplary embodiment.

FIG. 11 shows an example of two instances of the same priority cache to reflect changes due to a cache access or update, performed in accordance with an exemplary embodiment. The priority cache 1105A and the priority cache 1105B are the same priority cache having three cache regions 1106, 1107 and 1108. Each of these cache regions 1106, 1107, 1108 may be associated with a different respective priority level 1, 2 or 3 and a different LRU linked list. In the current example, the cache region 1106 may include the data items 1110, 1011 and 1012. At time t1, the cache region 1107 may include the data items 1103 and 1104, and the cache region 1108 may include the data items 1115 and 1116. The data item 1115 may be at the head and the data item 1116 may be at the tail of the corresponding LRU linked list. When the data item 1115 is accessed by the application 605 (shown in FIG. 6), the data item 1115 becomes the MRU data item. As a result, it is moved to the tail of the LRU linked list. This is shown in the priority cache 1105B at time t2. The arrow 1140 shows the change in position of the data item 1115 at time t1 and at time t2.

For some embodiments, a data item may be added to the priority cache 606 at any priority level if the priority cache 606 is below capacity. When the priority cache 606 becomes full (e.g., based on a threshold number), all of the LRU linked lists may be examined. A new data item may displace an existing item if the LRU linked list associated with the existing data item exceeds its reservation. A new data item may displace the LRU data item of the same LRU linked list (same priority level). In general, if a data item is to be replaced, it is the LRU data item.

It may be possible for a data item to be a high value data item for different purposes. For some embodiments, to support access of the data item in multiple unrelated purposes, the priority level of the data item may only be promoted and not demoted during an update operation. For some embodiments, an age value may be stored with each data item in order to keep track of the age of one data item relative to the ages of all other data items in the priority cache 606. The age value may be used as a tiebreaker if multiple LRU linked lists are over the reservation count, in order to determine which data item in the LRU linked lists among all of the data item candidates to remove. The application 605 may update the age of the data item in an update operation or when the data item is accessed from the priority cache 606. For some embodiments, a time-to-live aging method may be used to determine which data item to remove. For some embodiments, when the capacity of the priority cache 606 is divided all to the cache regions (i.e., sum of capacity of all cache regions is equal to capacity of priority cache 606), the priority cache 606 may eventually settle into an assigned distribution. In situations when not all of the capacity of the priority cache is allocated, the remaining capacity may shift among the different cache regions over time.

Figure 12:
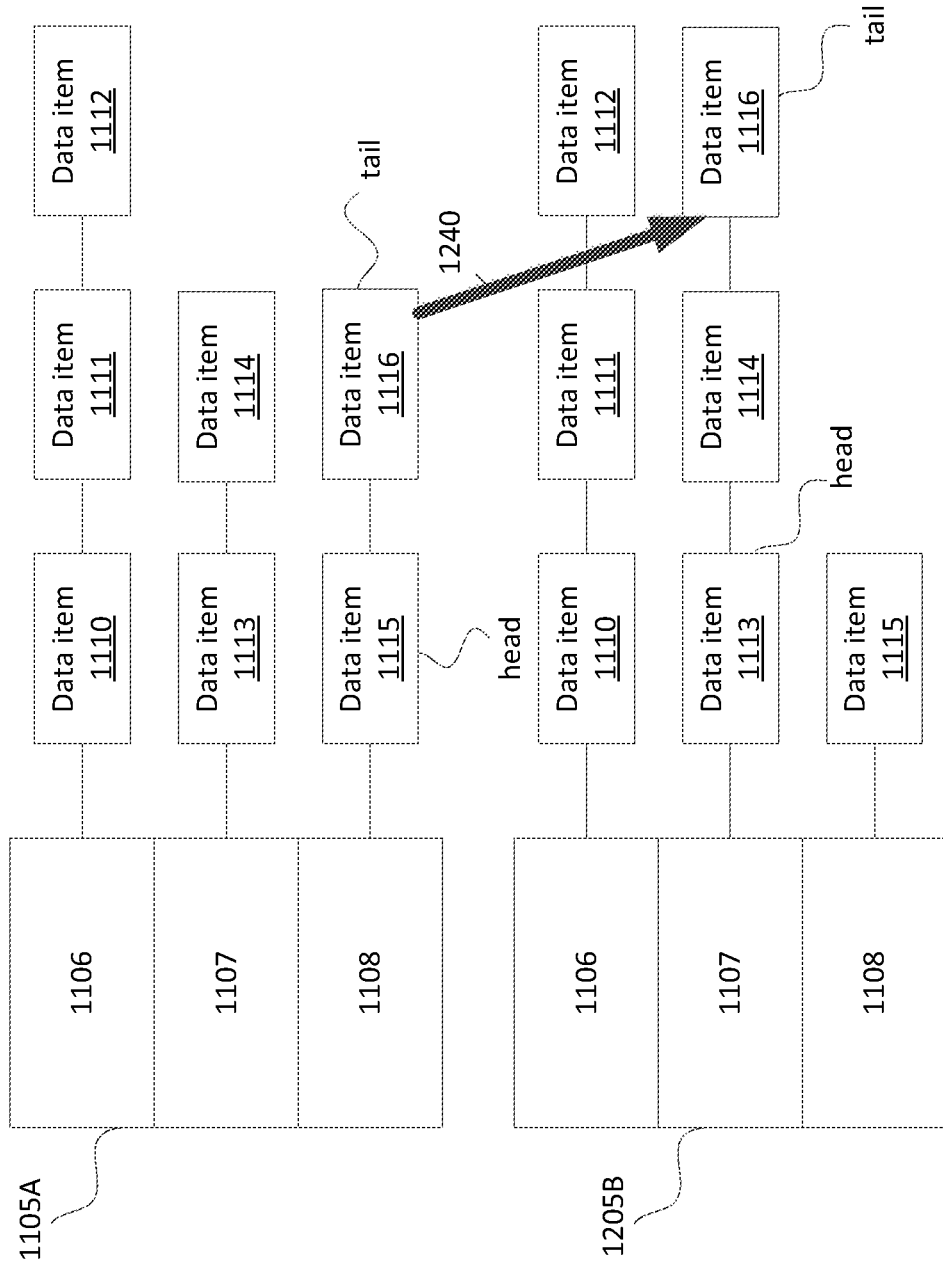
FIG. 12 shows another example of two instances of the same priority cache to reflect changes due to a promotion of a data item to a different priority level, performed in accordance with an exemplary embodiment.

FIG. 12 shows another example of two instances of the same priority cache to reflect changes due to a promotion of a data item to a different priority level, performed in accordance with an exemplary embodiment. The priority cache 1105A and the priority cache 1205B are the same priority cache having three cache regions 1106, 1107 and 1108. At time t3, the cache region 1108 may include the data items 1115 and 1116. The data item 1115 may be at the head and the data item 1116 may be at the tail of the corresponding LRU linked list. When the data item 1116 is updated by the application 605 (shown in FIG. 6), the data item 1116 may be promoted from its current priority level (associated with the cache region 1108) to a higher priority level (associated with the cache region 1107) and also becomes the MRU data item (at the head of the corresponding LRU linked list) at the higher priority level. This is shown in the priority cache 1205B at time t4. The arrow 1240 shows the change in position of the data item 1115 from the cache region 1108 to the cache region 1107 at time t4.

For some embodiments, when a data item is added or updated in a cache region, it is moved from its current position of its associated LRU linked list to the tail of the LRU linked list. When necessary, the data item in the head position of the same LRU linked list is removed to make room for the new or updated data item at the tail of the LRU linked list. It may be possible that the data item to be added to a cache region is a first data item and it may be both the head and the tail of the LRU linked list.

When the application 605 needs to access a data item, it may first query the priority cache 606 before querying the database. When it is necessary for the application 605 to query the database for a specific data item because the data item is not in the priority cache 606, the application 605 may need to determine whether to cache the data item in the priority cache 606, and if so, the application 605 may also need to determine a priority level to assign to the data item, based on the context.

For some embodiments, when the application 605 adds a new data item to the database or updates an existing data item in the database, the application 605 may update the database and then update the priority cache 606 if it determines that the new or updated data item is to be added to the priority cache 606. When the application 605 needs to remove a data item from the database and that data item is currently stored in the priority cache 606, the application 605 may first remove the data item from the priority cache 606, then remove the data item from the database. For some embodiments, the application 605 may release the priority cache 606 before it closes the database.

Figure 13:
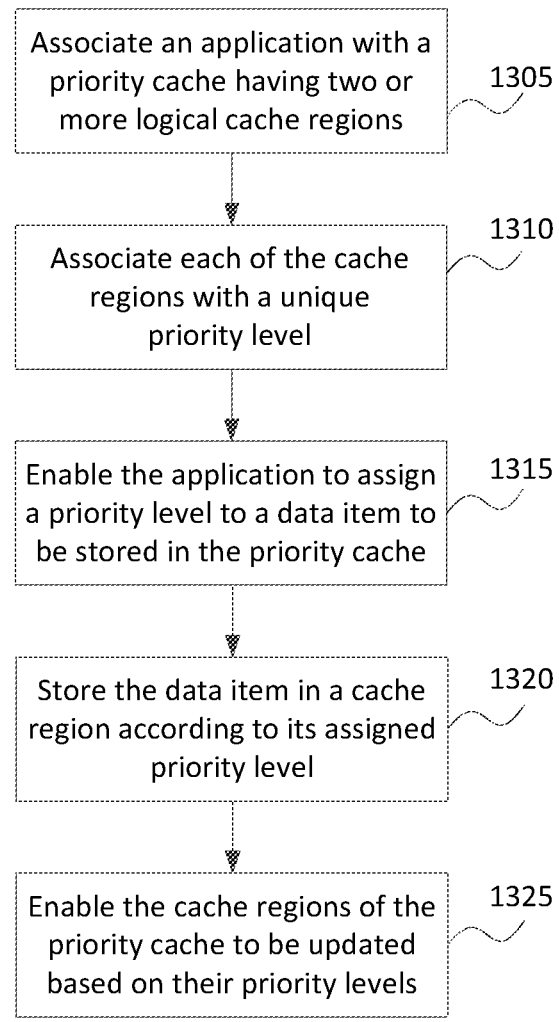
FIG. 13 shows a flowchart of an example of a method for enabling an application to assign a priority level to a data item, performed in accordance with an exemplary embodiment.

FIG. 13 shows a flowchart of an example of a method for enabling an application to assign a priority level to a data item, performed in accordance with an exemplary embodiment. At block 1305, an application may be associated with a priority cache such as, for example, the priority cache 606. The priority cache may include several logical cache regions. Each of the cache regions may be associated with a priority level, as shown in block 1310. Each of the cache regions may be associated with an LRU linked list and may be configured to store data items used by the application. At block 1315, the application is configured to assign a priority level to a data item. This may be based on the context of the data. For example, the application may be configured to determine whether the data item is a high value data item that may be likely to be used again.

Depending on that determination, the application may assign one of the available priority levels to the data item, as shown in block 1320. A high priority level may result to the data item being stored in a cache region associated with the high priority level. A low priority level may result in the data item being stored in a cache region associated with a low priority level. At block 1325, the cache regions of the priority cache may be updated based on the operation of the application. This may include promoting a data item from one cache region to another cache region. This may include moving a data item within a LRU linked list based on being the most recently used (MRU). This may include removing a data item from a cache region based on the associated LRU linked list being full.

Although the block 1310 describes assigning a priority level to a data item, it may be possible that the application accesses a data item from the priority cache, and a priority level has already been assigned to the data item. In this situation, the status of the data item may be changed in the cache region that it is associated with. For example, this status change may reflect the data item being the most recently used (MRU). It's possible that the status change may reflect the data item being promoted from one cache region to another cache region if the application determines that the data item should be assigned a higher priority level. It's possible that the status change may reflect the data item being demoted from one cache region to another cache region if the application determines that the data item should be assigned a lower priority level. It's also possible that the data item may be dropped completely from the priority cache if the application determines that the data item will not be used again in the near future.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A computer-implemented method comprising:
    associating an application with a priority cache separate from a database cache of a database systems, the priority cache having a first cache region with a first priority level and a second cache region with a second priority level, the first cache region organizing a first set of copies of database items stored at the database systems using a first linked list and the second cache region organizing a second set of copies of database items stored at the database systems using a second linked list, the application being able to perform one or more data operations at the priority cache and assign a priority level to any respective copy of a database item, the one or more data operations including: an accessing data operation, an updating data operation, and an adding data operation from a cloud-based environment;
    adding, by the application, a new database item to the database cache; and
    assigning, by the application, the first priority level to a copy of the new database item, for storage of the copy of the new database item in the first cache region based in part on a context of the data operations performed by the application on the copy of the new database item, without regard to a context of the new database item in the database cache, indicating a high likelihood of the copy of the new database item in the first cache region being used by the application within a first future time period.

2. The method of claim 1, wherein a respective copy of a database item stored in a cache region associated with a higher priority level is not removed from the priority cache by a respective copy of a database item associated with a lower-priority level.

3. The method of claim 1, wherein a most recently used (MRU) copy of a database item is placed at a tail of the first linked list, and a least recently used (LRU) copy of a database item is placed at a head of the first linked list.

4. The method of claim 3, wherein the copy of a database item in the first linked list is re-positioned from its current position in the first linked list to the tail of the first linked list based on the copy of a database item being accessed by the application.

5. The method of claim 4, wherein moving the copy of a database item from the first cache region to the second cache region comprises re-positioning the copy of a database item in the first linked list to a second linked list.

6. The method of claim 5, wherein each of the cache regions of the priority cache is associated with a reservation.

7. The method of claim 6, wherein an unused portion of a reservation of a lower priority cache region is re-allocated to a higher priority cache region based on the higher priority cache region being full.

8. The method of claim 3, wherein the copy of the database item stored in the first cache region is associated with a unique identifier, and wherein the unique identifier is used by a hash function to enable mapping the copy of the database item to a slot of a hash table associated with the priority cache.

9. The method of claim 8, wherein a collision linked list is used to associate copies of database items that are hashed into a similar slot of the hash table associated with the priority cache.

10. The computer-implemented method of claim 1, further comprising:

querying, by the application, at least one of the first and second cache regions for a copy of a particular database item;

determining, by the application, absence of the copy of the particular database item in each queried cache region of the priority cache;

accessing, by the application, the particular database item at the database system; and assigning, by the application, the first priority level to a new copy of the particular database item based in part on a context of the data operations performed by the application on the new copy of the particular database item, without regard to a context of the particular database item in the database caches, indicating a high likelihood of the new copy of the particular database item in the first cache region being used by the application within a second future time period.

11. The computer-implemented method of claim 1, further comprising:

storing, by the application, an age value associated with the copy of the new database item in the first cache region using the first linked list based on the assigned first priority level of the copy of the new database item corresponding to the first cache region of the priority cache associated with the application; and moving, by the application, the copy of the new database item from the first linked list in the first cache region in the priority cache to the second linked list in second cache region in the priority cache and updating the age value associated with the copy of the new database item in response to the application changing the first priority level of the copy of the new database item to the second priority level corresponding to the second cache region.

12. A computer program product, comprising a non-transitory computer-readable medium having a computer-readable program code embodied therein, the computer-readable program code adapted to be executed by one or more processors to:

associate an application with a priority cache separate from a database cache of a database system, the priority cache having a first cache region with a first priority level and a second cache region with a second priority level, the first cache region organizing a first set of copies of database items stored at the database systems using a first linked list and the second cache region organizing a second set of copies of database items stored at the database systems using a second linked list, the application being able to perform one or more data operations at the priority cache and assign a priority level to any respective copy of a database item, the one or more data operations including: an accessing data operation, an updating data operation, and an adding data operation from a cloud-based environment;

add, by the application, a new database item to the database cache; and assign, by the application, the first priority level to a copy of the new database item, for storage of the copy of the new database item in the first cache region based in part on a context of the data operations performed by the application on the copy of the new database item, without regard to a context of the new database item in the database cache, indicating a high likelihood of the copy of the new database item in the first cache region being used by the application within a first future time period.

13. The computer program product of claim 12, wherein a respective copy of a database item stored in a cache region associated with a higher priority level is not removed from the priority cache by a respective copy of a database item associated with a lower-priority level.

14. The computer program product of claim 13, wherein a most recently used (MRU) copy of a database item is placed at a tail of the first linked list, and a least recently used (LRU) copy of a database item is placed at a head of the first linked list.

15. The computer program product of claim 14, wherein the copy of a database item in the first linked list is re-positioned from its current position in the first linked list to the tail of the first linked list based on the copy of a database item being accessed by the application; and wherein moving the data item from the first cache region to the second cache region comprises re-positioning the data item in the first linked list to a tail of a second linked list.

16. The computer program product of claim 15, wherein each of the cache regions of the priority cache is associated with a reservation, and wherein unused portion of a reservation of a lower priority cache region is re-allocated to a higher priority cache region based on the higher priority cache region being full.

17. A system comprising:

one or more processors; and a non-transitory computer readable medium storing a plurality of instructions, which when executed, cause the one or more processors to:

associate an application with a priority cache separate from a database cache of a database systems, the priority cache having a first cache region with a first priority level and a second cache region with a second priority level, the first cache region organizing a first set of copies of database items stored at the database systems using a first linked list and the second cache region organizing a second set of copies of database items stored at the database systems using a second linked list, the application being able to perform one or more data operations at the priority cache and assign a priority level to any respective copy of a database item, the one or more data operations including: an accessing data operation, an updating data operation, and an adding data operation from a cloud-based environment;

add, by the application, a new database item to the database cache; and assign, by the application, the first priority level to a copy of the new database item, for storage of the copy of the new database item in the first cache region based in part on a context of the data operations performed by the application on the copy of the new database item, without regard to a context of the new database item in the database cache, indicating a high likelihood of the copy of the new database item in the first cache region being used by the application within a first future time period.

18. The system of claim 17, wherein a respective copy of a database item stored in a cache region associated with a higher priority level is not removed from the priority cache by a respective copy of a database item associated with a lower-priority level.

19. The system of claim 18,
wherein a most recently used (MRU) copy of a database item is placed at a tail of the first linked list, and a least recently used (LRU) copy of a database item is placed at a head of the first linked list;
wherein the copy of a database item in the first linked list is re-positioned from its current position in the first linked list to the tail of the first linked list based on the copy of a database item being accessed by the application; and
wherein moving the copy of a database item from the first cache region to the second cache region comprises re-positioning the copy of a database item in the first linked list to a second linked list.

20. The system of claim 19, wherein the plurality of instructions, which when executed further cause the one or more processors to assign an age value to each of the copies of database items to be stored in the priority cache, wherein the age value is used to determine which of the copies of database items is to be removed from its associated cache region when the associated cache region is full.

\* \* \* \* \*